United States Patent [19]
Worley

[11] 3,815,953
[45] June 11, 1974

[54] BICYCLE SADDLE
[75] Inventor: George W. Worley, Bolivar, Tenn.
[73] Assignee: Troxel Manufacturing Company, Moscow, Tenn.
[22] Filed: Oct. 4, 1972
[21] Appl. No.: 294,764

[52] U.S. Cl............. 297/195, 297/218, 297/DIG. 1
[51] Int. Cl............................................ B62j 1/00
[58] Field of Search .......... 297/195, 214, 218, 219, 297/DIG. 1; 160/184

[56] References Cited
UNITED STATES PATENTS
| | | | |
|---|---|---|---|
| 2,190,992 | 2/1940 | Misinger | 297/214 |
| 2,300,379 | 10/1942 | Faulhaber | 297/214 X |
| 3,088,517 | 5/1963 | Schartz et al. | 160/184 |
| 3,588,171 | 6/1971 | Rich, Jr. | 297/214 |

Primary Examiner—James T. McCall
Attorney, Agent, or Firm—John R. Walker, III

[57] ABSTRACT

An improvement in bicycle saddles of the type having a supported base which is covered with a plastic cover and has resilient padding inserted between the base and cover. Also, the base is the well known type which has an open nose. The improvement includes tongue and groove interlocking structure for locking the nose of the cover to the nose of the base, i. e., thus obviating the use of any other type fastener. The resilient pad insert urges the tongue and groove into a positive interlocking arrangement. The rear of the cover is attached to the base in any typical manner.

4 Claims, 4 Drawing Figures

PATENTED JUN 11 1974 3,815,953

BICYCLE SADDLE

BACKGROUND OF THE INVENTION

1. Field of the Invention

This invention relates to bicycle saddles.

2. Description of the Prior Art

The usual practice in attaching the cover of an open-nosed saddle to the base is to use rivets or the like. In addition, the applicant has knowledge of a bicycle saddle cover which utilizes a web connecting the skirt portions of the nose and webs extending across and under the rear corners of the base to hold the cover to the base.

SUMMARY OF THE INVENTION

The present invention is directed toward an improvement in bicycle saddles of the type having an open nose supported base which is covered with a plastic cover and has resilient padding inserted between the base and cover. The improvement includes tongue and groove interlocking structure for locking the nose of the cover to the nose of the base, thus obviating the use of other type fasteners such as rivets, webs or the like. The resilient pad urges the tongue and groove into a positive interlocking engagement. The rearward portion of the cover is attached to the base in any typical manner such as rivets or the like.

DESCRIPTION OF THE PREFERRED EMBODIMENT

Figure 1:
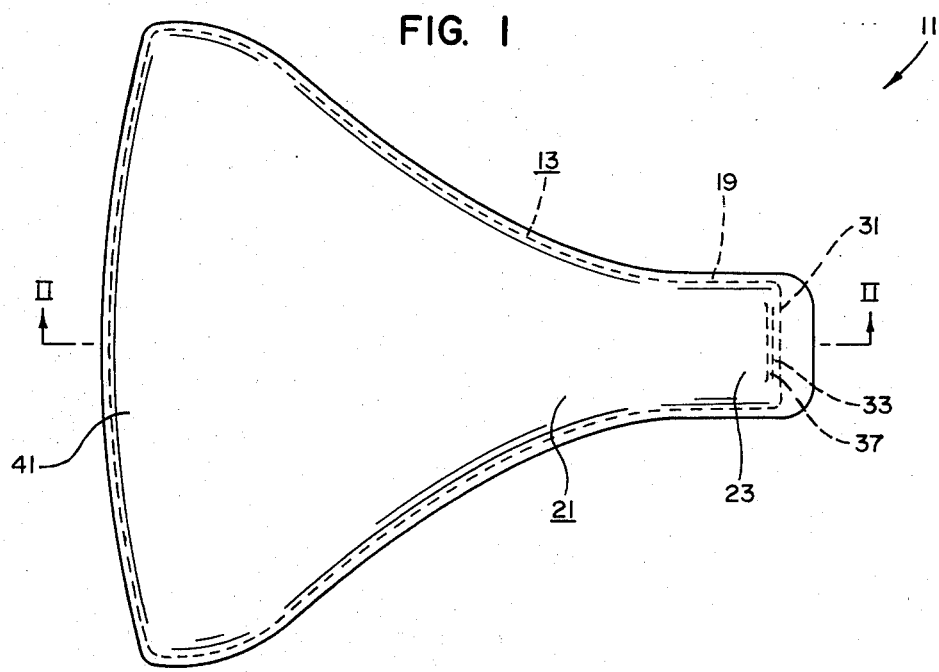
FIG. 1 is a top view of the saddle of the present invention.
Figure 2:
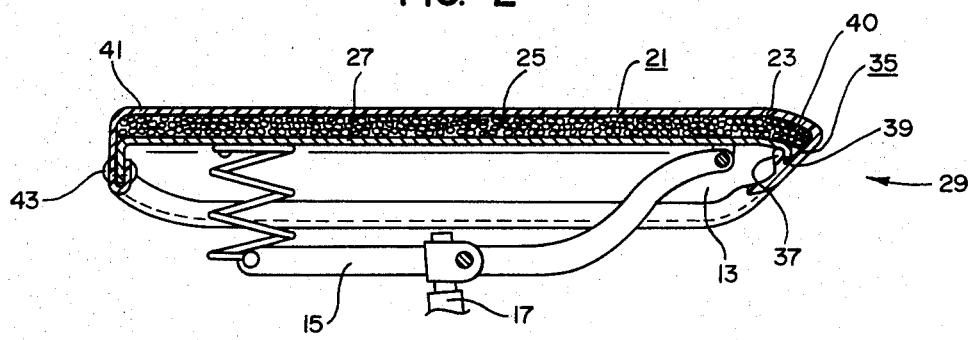
FIG. 2 is a sectional view taken as on the line II—II of FIG. 1.
Figure 3:
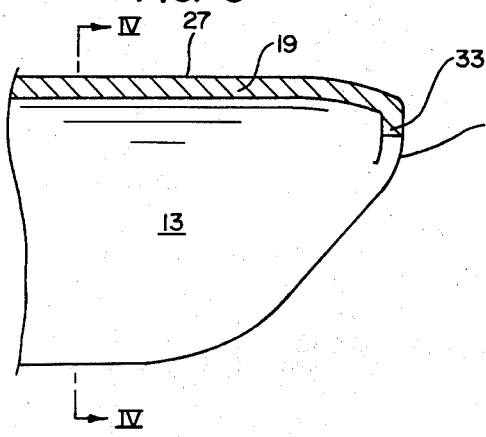
FIG. 3 is an enlarged fragmentary sectional view showing the nose portion only of the base which is fully shown in FIG. 2.
Figure 4:
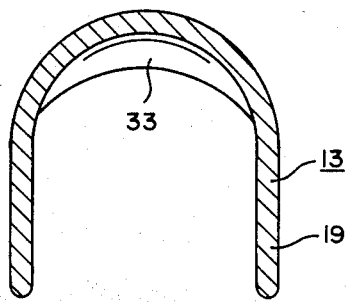
FIG. 4 is a sectional view taken as on the line IV—IV of FIG. 3 showing the open nose structure of the base and the crescent-shaped tongue depending therefrom.

The present invention is directed toward a bicycle saddle 11 which is of the type having a base 13 usually supported by typical truss structure 15 which is suitably attached to a saddle post 17 in a well known manner and is clearly shown in FIG. 2 of the drawings. The base 13 of the saddle 11 is the type having an open nose 19 which is best shown in FIGS. 3 and 4 of the drawings. The saddle 11 also includes a cover 21 preferably formed from suitable plastic, e.g., vinyl or the like, and has a nose portion 23 which fits over the nose 19 of the base 13. The saddle 11 also includes a resilient padding 25 which is interposed between the upper surface 27 of the base 13 and the cover 21.

The saddle 11 of the present invention includes nose-lock means 29 for locking the nose 23 of the cover 21 to the nose 19 of the base 13 in a manner as shown in FIG. 2 of the drawings. The resilient padding 25 urges the lock means 29 into an interlocking engagement in a manner which will be more apparent as the specification proceeds.

From FIGS. 3 and 4 of the drawings, it may be seen that the nose 19 of the base 13 terminates abruptly as at 31 with the abrupt terminus 31 having an arcuate cross section substantially as shown in FIG. 4. The nose lock means 29 includes first and second coacting elements 33, 35. The first element 33 is disposed adjacent the terminus 31 as shown in FIGS. 3 and 4 and the second element 35 is integrally formed with the plastic cover 21 as clearly shown in FIG. 2.

More specifically, the first element 33 consists of a downwardly directed laterally extending crescent-shaped tongue with the tongue being fixedly attached to the nose 19 in any well known manner as by being integrally formed therewith. The second element 35 includes an upwardly directed laterally extending lip 37 which defines in part an upwardly directed groove 39 with the groove 39 being suitably shaped for complementally receiving the first element or tongue 33.

From FIG. 2 of the drawings, it can be seen that the resilient padding 25 urges the lock means 29 into an interlocking engagement, i.e., the resilient padding 25 in the relaxed condition being larger than the space 40 is slightly compressed in the area adjacent the nose 23. The rear of the cover, as at 41, is attached to the base 13 in a typical manner, such as by rivets 43 or the like.

Although the invention has been described and illustrated with respect to a preferred embodiment thereof, it is to be understood that it is not to be so limited since changes and modifications may be made therein which are within the full intended scope of the invention.

I claim:

1. In a bicycle saddle of the type having a supported base; a plastic cover extending over the upper surface of said base, said base and cover respectively having nose portions, resilient padding means interposed between the upper surface of said base and said cover; the improvement which comprises nose lock means for locking said nose of said cover to said nose of said base with said resilient padding means urging said lock means into an interlocking engagement.

2. The improvement of claim 1 in which said nose lock means includes first and second coacting elements, said nose of said base terminating abruptly with an arcuate cross section, said first element being disposed adjacent said terminus of said nose of said base, and said second element being integrally formed with said plastic cover.

3. The improvement of claim 2 in which said first element includes a downwardly directed laterally extending crescent shaped tongue fixedly attached to said nose of said base, and said second element includes an upwardly directed laterally extending lip defining in part an upwardly directed groove with said groove complementally receiving said tongue.

4. In a bicycle saddle of the type having a supported base; a resilient cover extending over the upper surface of said base, said base and cover respectively having nose portions, resilient padding means interposed between the upper surface of said base and said cover; the improvement which comprises nose lock means for locking said nose of said cover to said nose of said base with said resilient padding means urging said lock means into an interlocking engagement, said nose lock means including first and second coacting elements; said first element including a downwardly directed tongue fixedly attached to said nose of said base and said second element including an upwardly directed lip defining in part an upwardly directed groove with said groove complementally receiving said tongue.

* * * * *